Aug. 16, 1949.  W. E. BURKE ET AL  2,479,001
PRODUCTION OF MAGNESIUM CHLORIDE
Filed May 29, 1944  3 Sheets-Sheet 3

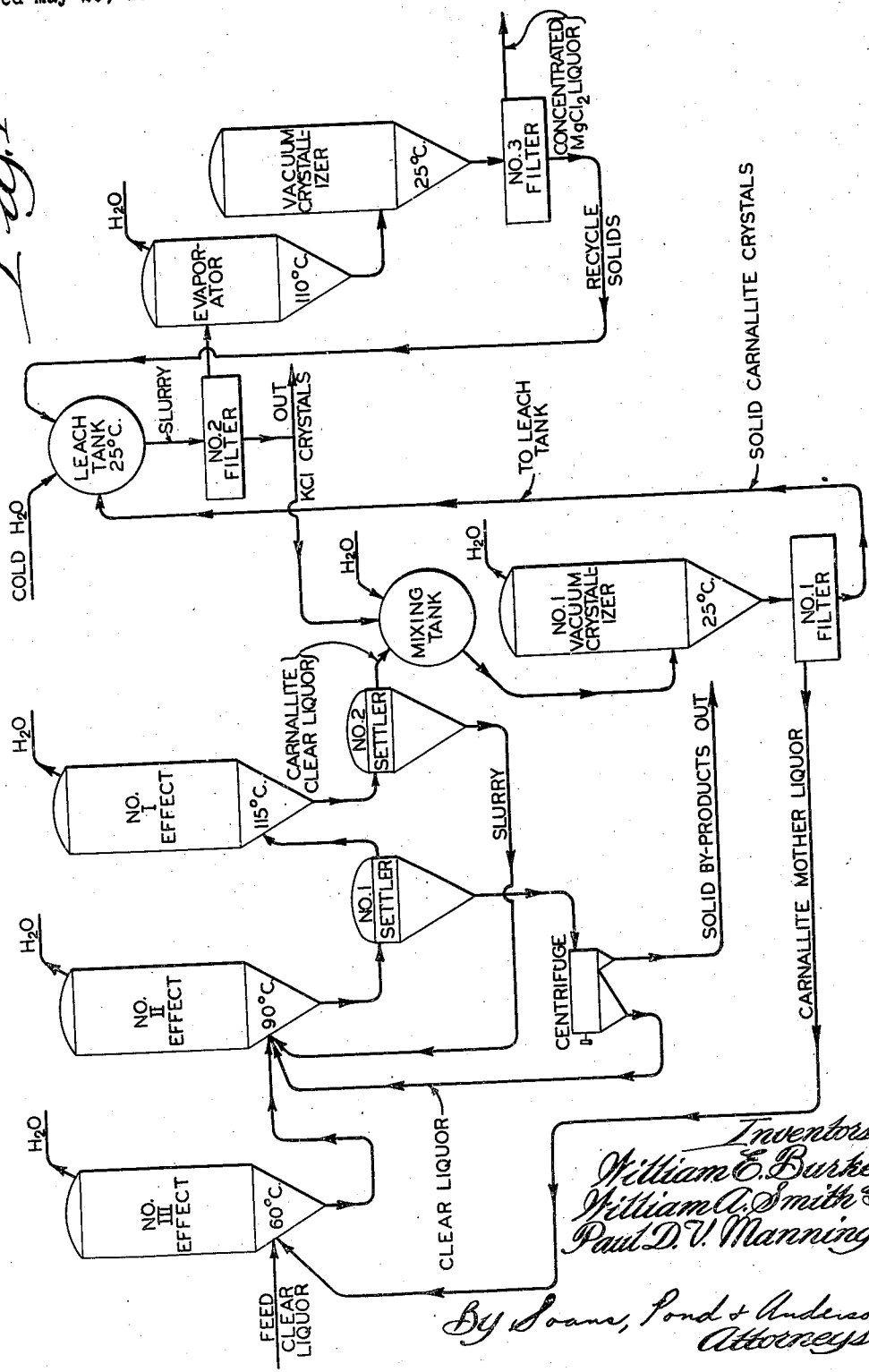

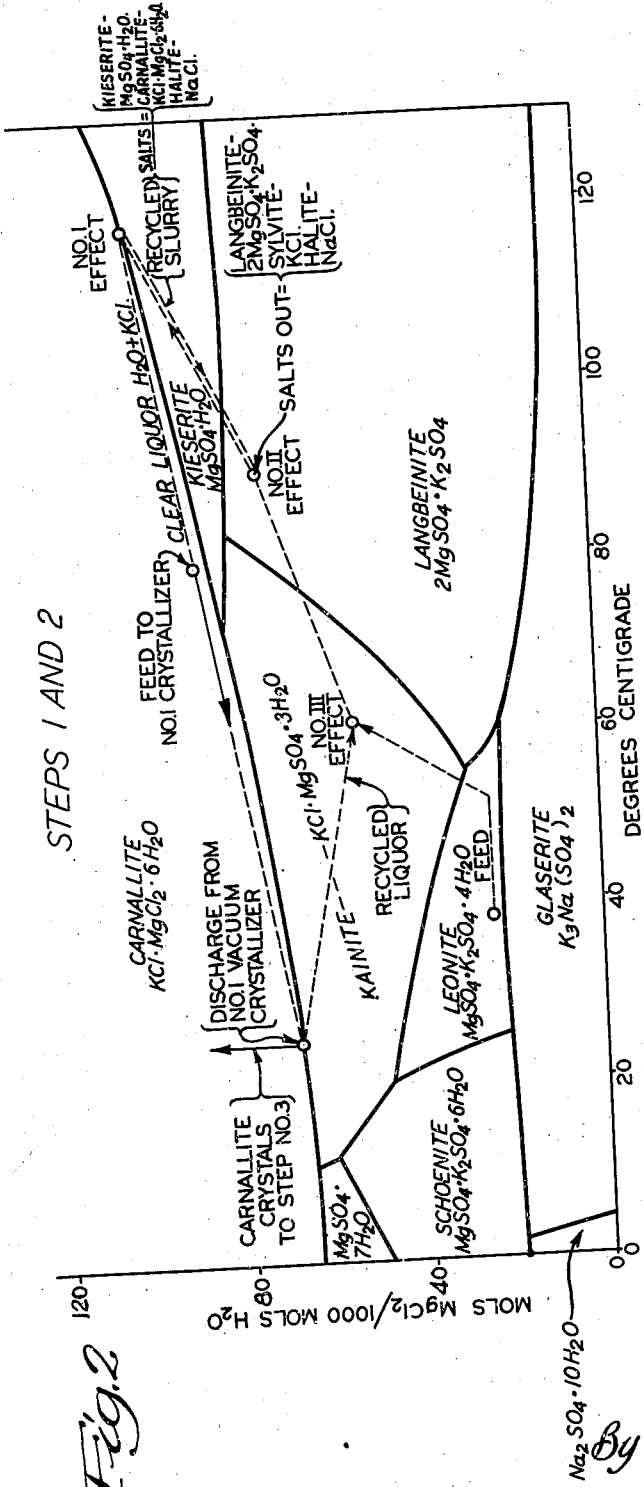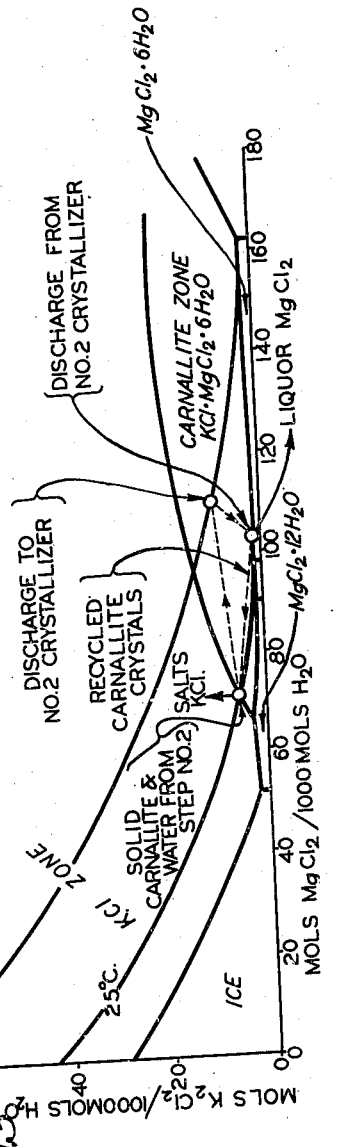

*Fig. 4*

BY-PRODUCT SALTS RECOVERED 1382#

| | | |
|---|---|---|
| K | 26.76% | 369# |
| Mg | 6.10% | 84# |
| Na | 6.15% | 86# |
| Cl | 24.97% | 344# |
| SO$_4$ | 36.02% | 499# |

LANGBEINITE 52.0%
KCl 32.1%
NaCl 15.9%

WATER EVAPORATED 7748#

NEW FEED 10000#

| | | |
|---|---|---|
| K | 6.03% | 603# |
| Mg | 3.65% | 365# |
| Na | 0.96% | 96# |
| Cl | 13.92% | 1392# |
| SO$_4$ | 4.99% | 499# |
| H$_2$O | 70.45% | 7045# |

STEP #1 — REMOVAL OF SULPHATES ETC. (EVAPORATION)

DISCH. LIQ. 13870#

| | | |
|---|---|---|
| K | 3.51% | 487# |
| Mg | 8.36% | 1160# |
| Na | 0.63% | 87# |
| Cl | 27.43% | 3808# |
| SO$_4$ | 1.50% | 208# |
| H$_2$O | 58.57% | 8120# |

KCl SOL'N. 3410#
K  312#
Cl  283#
H$_2$O  2815#

MIXING TANK

STEP #2 — PRODUCTION OF CARNALLITE CRYSTALS (VACUUM COOLING)

WATER EVAPORATED 865#

CARNALLITE CRYSTALS 3415#

| | | |
|---|---|---|
| K | 13.92% | 547# |
| Mg | 8.66% | 281# |
| Na | 0.41% | 10# |
| Cl | 38.51% | 1330# |
| SO$_4$ | | |
| H$_2$O | 38.50% | 1247# |
| CARNALLITE | 94.00% | |
| KCl | 5.32% | |
| NaCl | 0.74% | |

RETURN CARNALLITE MOTHER LIQUOR 13000#

| | | |
|---|---|---|
| K | 1.95% | 253# |
| Mg | 6.76% | 879# |
| Na | 0.59% | 77# |
| Cl | 21.21% | 2760# |
| SO$_4$ | 1.60% | 208# |
| H$_2$O | 67.89% | 8823# |

793# H$_2$O

STEP #3 — LEACHING MgCl$_2$ FROM CARNALLITE

MgCl$_2$ SOL'N. 3140#

| | | |
|---|---|---|
| Mg | 8.95% | 281# |
| Cl | 26.05% | 819# |
| H$_2$O | 65.00% | 2040# |
| MgCl$_2$ | 100% | |

KCl CRYSTALS 1068#

| | | |
|---|---|---|
| K | 51.20% | 547# |
| Na | 0.95% | 10# |
| Cl | 47.85% | 511# |
| KCl | 97.66% | |
| NaCl | 2.34% | |

Inventors:
William E. Burke,
William A. Smith and
Paul D. V. Manning,
By Soans, Pond & Anderson
Attorneys.

Patented Aug. 16, 1949

2,479,001

UNITED STATES PATENT OFFICE 2,479,001

PRODUCTION OF MAGNESIUM CHLORIDE

William E. Burke and William A. Smith, Carlsbad, N. Mex., and Paul D. V. Manning, Glencoe, Ill., assignors to International Minerals & Chemical Corporation, a corporation of New York Application May 29, 1944, Serial No. 537,764

3 Claims. (Cl. 23—91)

Our invention relates to improvements in the production of magnesium chloride from an aqueous solution containing not only magnesium and chlorine ions, but also undesired substances such as potassium, sodium and sulphate ions.

For certain purposes, for example when used as a feed for electrolytic cells employed in the production of magnesium metal, the magnesium chloride should be of high purity, and particularly it should contain the minimum amount of sulphate, because sulphate is very undesirable from the standpoint of satisfactory operation of the electrolytic cells used in the production of magnesium metal. However, certain minerals containing magnesium frequently also contain sulphates in addition to other substances. For instance, the magnesium-containing minerals such as are found in the Carlsbad, New Mexico, or other similar mineral deposits contain magnesium principally in the form of Langbeinite ($2MgSO_4.K_2SO_4$), Kainite ($KCl.MgSO_4.3H_2O$), or Kieserite ($MgSO_4.H_2O$).

Also, as is usual in the case of minerals obtained from such deposits, other undesirable materials are present in the ores, for example Halite (NaCl) or Sylvite (KCl). In the commercial beneficiating processes in which various products, for example potash and magnesium compounds, are obtained as the principal products or as the by-products of a concentrating, refining or chemical process, it is not possible to obtain or recover substances which are 100% pure.

For example, a typical by-product liquor or brine which is produced in the Carlsbad, New Mexico, area may contain the following substances:

| | Per cent |
|---|---|
| K | 6.03 |
| Mg | 3.65 |
| Na | 0.96 |
| Cl | 13.92 |
| $SO_4$ | 4.99 |
| $H_2O$ | 70.45 |

This invention will be described as applied to the production of a relatively pure solution of $MgCl_2$ from a liquor containing the above-mentioned substances.

In general, it may be stated that the invention contains a number of features some of which may be independently performed, while other features of the invention should be practiced in combination with each other. The principal process steps which are useful in producing a relatively pure concentrated magnesium chloride solution from a brine or liquor of the general character indicated may be said to consist of three main steps or stages.

The first of these stages consists in the elimination of undesirable substances, such as sodium or sulphates in the solid phase, or at least enough of these substances so that they will not be carried forward in the brine to the subsequent steps of the process in a sufficient amount to interfere with the production of an end product having the desired degree of purity.

The second stage of the process may be said to consist in the production of substantially pure crystals of Carnallite ($KCl.MgCl_2.6H_2O$) from the liquor from which the objectionable substances have been largely removed in the first stage of the process.

The third stage of the process consists in forming the magnesium chloride solution from the Carnallite crystals and water, preferably by a relatively simple leaching operation, and the subsequent separation of the magnesium chloride in the form of a relatively pure concentrated solution, as an end product of the process.

As an incident to the practice of the entire process, various by-products are formed, which may be returned to the system or by-products may be otherwise disposed of, it being understood that the primary object of the present process is the production of as large a percentage of pure magnesium chloride solution as possible from the feed liquor.

In order to assist in describing and understanding the various features of the complete process, we have prepared certain drawings, which accompany this application.

In said drawings,

Fig. 1 is a flow sheet of the entire process;

Fig. 2 is a phase diagram useful in understanding the first two steps of the process as above described;

Fig. 3 is a phase diagram pertaining to the third stage of the process as above described; and Fig. 4 is a chart showing the composition of the flow at various points in the system, and the amounts and percentages of materials at such points.

In the first stage of the process, the feed liquor is preferably first concentrated by evaporation at a relatively low temperature so as to eliminate a substantial amount of water. Then the temperature is raised, and the liquor is further concentrated by evaporation. At this point in the process, there are formed crystals of materials such as Langbeinite, also chlorides of potassium and sodium, the percentage of these other substances depending, of course, upon the composition of the feed liquor. Concentration by evaporation is then continued at a higher temperature, and at this zone of higher temperature and concentration, crystals of other materials come out of solution, for example Kieserite and some Carnallite, together with crystals of other materials, and usually a little Halite.

The crystals formed in the final concentration of the original liquor could be discarded, but if, as in the present process, it is desirable to save as much magnesium as possible, the discarding of the crystals at this stage would result in discarding a molecule of magnesium with each molecule of sulphate, in view of the fact that most of the sulphate crystallizes out as Kieserite ($MgSO_4.H_2O$). Therefore, preferably the crystals formed in the final concentration are settled to a dense slurry and returned to a prior stage of the process, where the Kieserite is converted into Langbeinite under favorable conditions, and, when these salts formed in the prior stage are separated and discarded, one-third of the magnesium will be retained in solution as compared with the elimination of the sulphate in the form of Kieserite.

The strong, hot liquor resulting from the final concentration and the removal of the Kieserite in the form of a slurry, is filtered to remove all of the suspended solids. A solution of KCl is then added to the clear liquor and the total solution thus formed is cooled, preferably in a vacuum cooler in which some water is evaporated during the cooling cycle. The purpose of adding the KCl solution is to supply a sufficient amount of potassium to assure the maximum production of Carnallite crystals and to supply a sufficient amount of water to retain the sulphates in solution, it being understood that, in this type of process, it is not always possible to obtain complete elimination of undesirable materials by a simple, single crystallization stage.

After the liquor has been diluted as stated, it is cooled and concentrated under vacuum as a result of which relatively pure crystals of solid Carnallite are formed. After this cooling has proceeded to the desired point, the liquor is recycled back to the system, preferably being combined with the feed liquor. The solid Carnallite crystals which then contain the desired magnesium which is to appear in the end product constitute the feed for the final stage of the process.

In the third or final stage of the process, the Carnallite crystals formed in the prior or second stage of the process are leached with pure water, at a relatively low temperature, so that there are formed crystals of potassium chloride in a magnesium chloride solution. These crystals of potassium chloride are separated from the liquor and may be used in part in a prior stage of the process or may be otherwise disposed of.

Preferably, after the potassium chloride crystals have been separated from the solution, the latter is heated and concentrated, during which stage there may be formed crystals of Carnallite and possibly small quantities of other undesired substances, possibly also small percentages of magnesium chloride, according to conditions.

The hot, concentrated liquor, together with any crystals which may have formed, is cooled, preferably in a vacuum crystallizer, so as to separate as completely as possible the KCl in the form of Carnallite. The crystals are then removed by filtration from the strong liquor, which is the end product of the process.

If it is desired to use magnesium chloride as a raw material for electrolytic cells in the production of magnesium metal, it will of course be obvious that it is necessary to convert the solution into solid form by any appropriate dehydration method, for example, by spray drying or otherwise.

Specific example

The particular example of the complete process referred to in the drawings is based upon the treatment of feed liquor having substantially the same composition as the Carlsbad by-product liquor above referred to, which is delivered to the system at the rate of 10,000 lbs. per hour. The quantities of materials shown in Fig. 4 of the drawings are those quantities of those materials which are used, produced or disposed of during each hour of operation of the system when supplied with feed liquor at the aforesaid rate.

The raw or feed liquor is first introduced into the low temperature, or No. 3 effect, of a triple effect evaporator, the liquor being held at a temperature of about 60° C. while being evaporated. In this effect 2034 lbs. of water are evaporated per hour.

The liquor partially concentrated at the low temperature of the No. 3 effect is then conducted into the No. 2 effect, where a liquid temperature of about 90° C. is maintained. At this point in the operation, water is evaporated at the rate of about 2366 lbs. per hour of operation.

From the No. 2 effect of the evaporator, (see Fig. 2), the liquor, which at that time contains crystals of Langbeinite ($2MgSO_4.K_2SO_4$), Sylvite (KCl), and Halite (NaCl), is delivered into the No. 1 settling tank, shown in Fig. 1, and the clear liquor from the No. 1 settler is then introduced into the high temperature of the No. 1 effect of the evaporator, the liquor being maintained at a temperature of about 125° C. At this point in the system 3348 lbs. of water per hour are removed.

From the No. 1 effect, the liquor which, as shown in Fig. 2 of the drawings, at that time contains crystals of Kieserite ($MgSO_4.H_2O$), Carnallite ($KCl.MgCl_2.6H_2O$), and Halite (NaCl), is delivered to the No. 2 settling tank.

The phase diagram, Fig. 2, shows the crystalline compounds which are formed in the complex brine under various temperature conditions and under various concentrations of magnesium ion, measured as magnesium chloride. It is clearly evident from the phase diagram that Langbeinite ($2MgSO_4.K_2SO_4$) will crystallize out of the solution and Kieserite ($MgSO_4.H_2O$) will remain in solution when the temperature of the solution is over about 60° C. and the concentration of magnesium ion, measured as magnesium chloride, is less than about 80 mols of magnesium chloride per 1000 mols of water. When the concentration of magnesium ion increases to a value where there are over about 80 mols of magnesium chloride to 1000 mols of water and the temperature of the solution is over about 70° C., Kieserite ($MgSO_4.H_2O$) will crystallize out of the solution. The first mentioned conditions, Langbeinite crystallizing out and Kieserite remaining in solution, occur in the No. 2 effect and the second mentioned conditions, wherein Kieserite and some Carnallite crystallizes out, are maintained in the No. 1 effect. Thus, crystals of Kieserite which may be recycled into the No. 2 effect from the No.

1 effect will be dissolved in the liquor in the No. 2 effect.

From the No. 2 settling tank the clear liquor, most of the non-aqueous constituents of which may be represented by the formula for Carnallite, is then delivered to a mixing tank, (see Fig. 1).

At this point in the process there is added to the clear Carnallite liquor a quantity of potassium chloride and a considerable volume of cold water. The amounts of the various substances which are put into the mixing tank are as shown in the circle on Fig. 4. By the time thorough mixing of the clear liquor and the KCl solution has been effected, the temperature of the liquor has been reduced to about 80° C. From the mixing tank the liquor is discharged into the No. 1 vacuum crystallizer where the liquor is cooled by evaporation to a temperature of about 25° C. At this point, water is evaporated at the rate of about 865 lbs. per hour, (see Fig. 4).

The slurry formed in the No. 1 vacuum crystallizer is then delivered to the No. 1 filter where the crystals, which are almost pure Carnallite, are separated, and are fed to the next stage of the process.

These solid Carnallite crystals are charged into the leach tank which is at the same temperature, 25° C., as the No. 1 vacuum crystallizer previously referred to, and at this point cold water at the rate of about 793 lbs. per hour is introduced. When the Carnallite crystals dissolve in the cold water the $MgCl_2$ part of the Carnallite formula stays in solution but the KCl part immediately recrystallizes, so that the liquor in the leach tank is in the form of a slurry which contains substantially pure crystals of KCl in a substantially pure solution of $MgCl_2$. This slurry is delivered to the No. 2 filter which separates the clear liquor from the crystals. The clear $MgCl_2$ liquor is then delivered to an Ozark evaporator where it is heated to a temperature of about 110° C. and further concentrated. The concentrated liquor flowing from the Ozark evaporator together with any salts which may have come out is then delivered to the No. 2 vacuum crystallizer where it is then cooled to a temperature of about 25° C. Any crystals which have been formed are then removed by No. 3 filter so as to produce clear liquor which is a virtually pure solution of $MgCl_2$, the desired end-product of the process.

In order to obtain as high a yield as possible in respect of magnesium recovery, it may be and usually is advantageous to re-cycle certain of the side products resulting from the various treatment stages which have been described. For example, in the third or leaching stage of the process, the solid crystals separated from the concentrated end-product in filter No. 3, which consist largely of Carnallite, are returned to the leach tank.

Part of the potassium chloride crystals which constitute the cake from the No. 3 filter at this third stage are used to supply the potassium chloride which is added to the mixing tank in the previous Carnallite or second stage of the process.

Also, it is advantageous to save the clear Carnellite mother liquor which flows from the No. 1 filter in the Carnellite stage, this mother liquor being added to the raw feed liquor which flows into the first evaporator (the No. 3 effect).

Similarly, the slurry constituting the underflow from the No. 2 settler in the Carnellite stage, is returned to the intermediate evaporating stage in the No. 2 effect. As previously stated, the purpose of this is to avoid the discarding of Mg. in the form of a simple sulphate of magnesium.

The underflow from the No. 1 settler is conducted to a centrifuge which separates the solids from the clear liquor and the clear liquor is also re-cycled back into the No. 2 effect. The solids coming from the centrifuge, the composition and quantities of which are shown in the drawings as by-product salts recovered, (see Fig. 4), pass out of the system at this point. These by-product salts may be sold as such or may be beneficiated to produce more valuable substances. The other valuable by-product of the combined operation consists of the unused part of the potassium chloride which is produced as a cake from the No. 2 filter which handles the slurry from the leach tank.

We claim:

1. The improvement in the art of removing undesired sulphate ions from an aqueous solution containing magnesium, potassium, chloride, and sulphate ions which comprises: evaporating water from the solution under conditions such that the solution passes through a phase in which Langbeinite will crystallize out of solution and Kieserite will remain in solution, said evaporation being carried on at a temperature of at least about 60° C. and at a concentration of magnesium ions, measured as magnesium chloride, such that there are less than about 80 mols of magnesium chloride per 1000 mols of water; and separating Langbeinite crystals from the solution while maintaining the solution at the aforesaid conditions.

2. The improvement in the art of removing undesired sulphate ions from an aqueous solution containing magnesium, potassium, chloride, and sulphate ions which comprises: first, evaporating water from the solution under conditions such that the solution passes through a phase in which Langbeinite will crystallize out of solution and Kieserite will remain in solution, said evaporation being carried on at a temperature of at least about 60° C. and at a concentration of magnesium ions, measured as magnesium chloride, such that there are less than about 80 mols of magnesium chloride per 1000 mols of water, separating Langbeinite crystals from the solution while maintaining said solution at the aforesaid conditions; evaporating water from the resultant liquor until the concentration of magnesium ion, measured as magnesium chloride, is over about 80 mols of magnesium chloride per 1000 mols of water, maintaining the temperature of the liquor over about 70° C. and separating the Kieserite crystals, which are formed, from the solution; and finally recycling the separated Kieserite crystals to the first evaporation step so that the Kieserite crystals become dissolved and Langbeinite crystals are formed, thereby effecting the removal of sulphate ions from the solution as Langbeinite.

3. The method of recovering sulphate free magnesium chloride from an aqueous solution containing magnesium, potassium, chloride, and sulphate ions which includes the steps of, first, evaporating water from the solution under conditions such that the solution passes through a phase in which Langbeinite will crystallize out of solution and Kieserite will remain in solution, said evaporation being carried out at a temperature over about 60° C. and a concentration of magnesium ions, measured as magnesium chloride, such that there are less than about 80 mols of magnesium chloride per 1000 mols of water, separating Langbeinite crystals from the solution while maintaining said solution at the aforesaid conditions; evaporating water from the resultant liquor till the concentration of magnesium ion, measured as magnesium chloride, is over about 80 mols of magnesium chloride per 1000 mols of water, maintaining the temperature of the liquor over about 70° C. and separating the Kieserite crystals which are formed from the solution; recycling the separated Kieserite crystals into the zone of the first evaporation so that the Kieserite crystals become dissolved and Langbeinite crystals are formed; mixing a potassium chloride solution with the liquor from which the Kieserite has been removed, evaporating water from the resulting solution at a temperature of about 25° C., whereby Carnallite crystals are formed; removing the Carnallite crystals from the liquor; recycling the Carnallite liquor to the first evaporation step; leaching said Carnallite crystals with cold water to dissolve magnesium chloride from the Carnallite; and evaporating the water from the magnesium chloride solution to form sulphate free magnesium chloride crystals.

WILLIAM E. BURKE.
WILLIAM A. SMITH.
PAUL D. V. MANNING.

REFERENCES CITED

The following references are of record in the file of this patent:

UNITED STATES PATENTS

| Number | Name | Date |
|---|---|---|
| 1,304,097 | Reeve | May 20, 1919 |
| 1,305,566 | Reeve | June 3, 1919 |

OTHER REFERENCES

Seidell, Solubilities of Inorganic and Organic Compounds, vol. 1, page 641 (1919), and vol. 2, page 1283 (1928) pub. by D. Van Nostrand Co., N. Y.